(12) United States Patent
Garg et al.

(10) Patent No.: US 11,586,666 B2
(45) Date of Patent: Feb. 21, 2023

(54) FEATURE-BASED SEARCH

(71) Applicant: Amazon Technologies, Inc., Reno, NV (US)

(72) Inventors: Nikhil Garg, Berlin (DE); Toma Belenzada, Berlin (DE); Sabine Sternig, Berlin (DE); Brad Bowman, Berlin (DE); Zohar Barzelay, Potsdam (DE)

(73) Assignee: Amazon Technologies, Inc., Reno, NV (US)

( * ) Notice: Subject to any disclaimer, the term of this patent is extended or adjusted under 35 U.S.C. 154(b) by 309 days.

(21) Appl. No.: 16/908,464

(22) Filed: Jun. 22, 2020

(65) Prior Publication Data

US 2020/0320118 A1 Oct. 8, 2020

Related U.S. Application Data

(63) Continuation of application No. 16/126,868, filed on Sep. 10, 2018, now Pat. No. 10,747,807.

(51) Int. Cl.
*G06F 16/583* (2019.01)
*G06F 16/56* (2019.01)
*G06N 5/046* (2023.01)
*G06F 3/04842* (2022.01)

(52) U.S. Cl.
CPC ............ *G06F 16/56* (2019.01); *G06F 16/583* (2019.01); *G06N 5/046* (2013.01); *G06F 3/04842* (2013.01)

(58) Field of Classification Search
CPC .... G06F 16/56; G06F 16/583; G06F 3/04842; G06F 3/0482; G06F 16/953; G06F 3/04883; G06N 5/046; G06N 5/02; G06N 3/0454; G06N 3/088; G06K 9/6254; G06V 20/20
USPC ....... 382/190, 100, 103, 124, 125, 126, 128, 382/155, 156, 158, 168, 173, 181, 232, 382/312
See application file for complete search history.

(56) References Cited

U.S. PATENT DOCUMENTS

| | | | |
|---|---|---|---|
| 7,657,126 B2 | 2/2010 | Gokturk | |
| 7,857,126 B2 * | 12/2010 | Bakker | F26B 15/26 198/840 |
| 8,718,369 B1 | 5/2014 | Tompkins | |
| 9,720,974 B1 * | 8/2017 | Sarmento | G06F 16/24573 |

(Continued)

OTHER PUBLICATIONS

Notice of Allowance issued in U.S. Appl. No. 16/126,868 dated Apr. 9, 2020.

*Primary Examiner* — Sheela C Chawan
(74) *Attorney, Agent, or Firm* — Hogan Lovells US LLP

(57) ABSTRACT

Various embodiments of systems and methods allow a system to identify subsets of items by mixing and matching identified features in one or more other items. A system can identify features of items in an item database. The system can then calculate "fingerprints" of these features which are vectors describing the characteristics of the features. The system can present a collection of items and a user can select an item of the collection. The user can then select positive features to include in a search and/or negative features to include in the search. The system can then do a search of the database for items that contain features similar to those positive features and do not contain features similar to those negative features. The user can select features through a variety of means.

20 Claims, 9 Drawing Sheets

(56) References Cited

U.S. PATENT DOCUMENTS

| | | | |
|---|---|---|---|
| 10,747,807 B1 * | 8/2020 | Garg | G06F 3/04883 |
| 2008/0082426 A1 | 2/2008 | Gokturk | |
| 2011/0093361 A1 * | 4/2011 | Morales | G06Q 30/0603 |
| | | | 705/26.62 |
| 2013/0132236 A1 * | 5/2013 | Gokturk | G06Q 30/0643 |
| | | | 705/26.61 |
| 2018/0010902 A1 * | 1/2018 | Gong | A61B 5/1072 |
| 2018/0342003 A1 * | 11/2018 | Siddiqui | G06Q 30/0627 |

* cited by examiner

FEATURE-BASED SEARCH

CROSS-REFERENCES TO RELATED APPLICATIONS

This application is a continuation of allowed U.S. application Ser. No. 16/126,868, entitled "FEATURE-BASED SEARCH," filed Sep. 10, 2018; of which the full disclosure of this application is incorporated herein by reference for all purposes.

BACKGROUND

As the amount of storage in computing systems increases, data navigation becomes increasingly complex. While researches have devised a variety of data structures and search techniques to minimize data access times, these techniques do not usually follow a user's intuition. For example, a user may mentally categorize items according to a particular taxonomy while a database administrator classifies those items according to a classification system. This can result in a frustrating experience as a user attempts to translate their intuitive organizational understanding to how they anticipate the system organizes and accesses information.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to identifying subsets of items by mixing and matching identified features in one or more other items. A system can identify features of items in an item database. The system can then calculate "fingerprints" of these features which are vectors describing the characteristics of the features. The system can present a collection of items and a user can select an item of the collection. The user can then select positive features to include in a search and/or negative features to include in the search. The system can then do a search of the database for items that contain features similar to those positive features and do not contain features similar to those negative features. The user can select features through a variety of means.

Various other functions and advantages are described and suggested below as may be provided in accordance with the various embodiments.

Figure 1A:
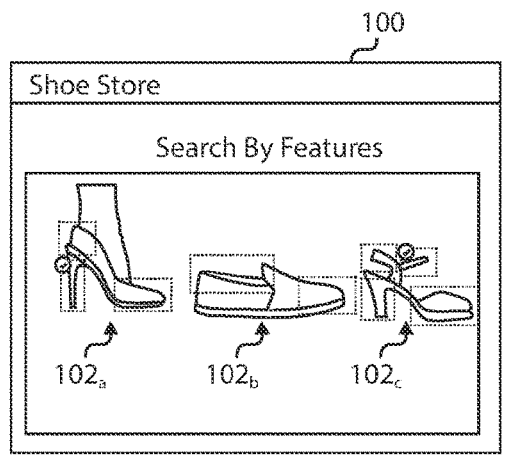
FIGS. 1A-1D illustrate a flow by which a user can search for shoes in a marketplace by identifying features that suit the user's tastes according to various embodiments.
Figure 1B:
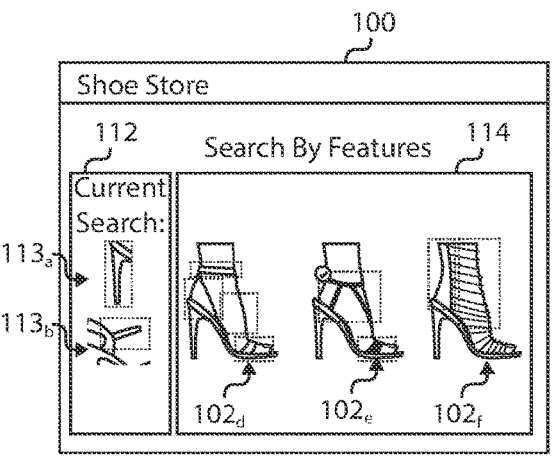

FIGS. 1A-1D illustrate a flow by which a user can search for shoes in a marketplace by identifying features that suit the user's tastes according to various embodiments. In FIG. 1A, a user interface 100 can represent a digital store whereby a user can shop for items such as shoes. The user interface can depict options $102_a$-$102_c$ of items that the user can choose. The user can then select various features that the user wishes to include in the user's search. For example, the user might select the heel of item $102_a$ and the strap of item $102_c$.

The system can then take the user's selection from FIG. 1A and apply a search on a database to find items that satisfy the search. For example, in FIG. 1B, the interface can show a results window 114 which can depict shoes $102_d$, $102_e$, and $102_f$ that fit the current search criteria $113_a$ and $113_b$ which are presented in current search window 112. These results can be determined using computer vision or other automatic techniques for determining similarities between items.

Figure 1C:
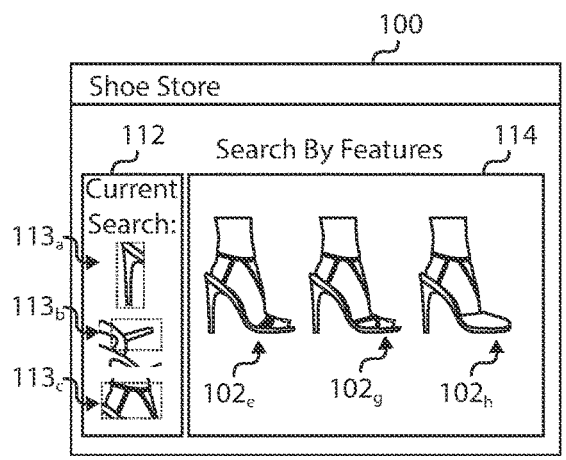
Figure 1D:
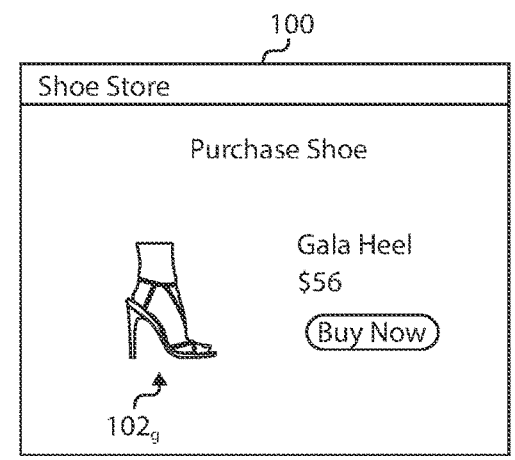

The user can further select features to narrow the search. For example, the user can select the ankle straps with shoe $102_e$. The interface 100 can then adjust so that it further presents a subset of items that satisfy the query as shown in FIG. 1C. For example, the current search window 112 represents the current search criteria $113_a$, $113_b$, and $113_c$. The resultant shoes $102_c$, $102_g$, and $102_h$ can be presented in search window 114.

The user can select a shoe $102_g$ and the interface 100 can present the user with an option to purchase the selected shoe. For example, the user can download, access, lease, rent, subscribe to, or otherwise obtain a physical or digital item. The user interface 100 can be provided by a digital marketplace.

Item search and discovery is significant challenge for online shopping, especially in the fashion domain. Often there are multiple appropriate results for a given user query and the relevance of a specific result is highly dependent on an individual's personal taste. By facilitating a user to search items using features from other items, the user can more effectively search for items that suit their preferences. This further enables the user to express their personal tastes more intuitively compared to text queries.

A query can describe multiple features (perhaps from different example items) and thus can provide greater flexibility than other approaches. For example, if an approach included having a user take an image of an item and a system would find similar items, such an approach would be limited to finding items that closely match the item as a whole, without allowing for variations. Multi-featured queries can be useful when a user likes one feature of one item and another feature of another item and would like to find items that have both of those features.

Approaches described herein can further allow users to select item features in a set of example images and use that for a more fine-grained search. Consider a situation where a user has not just one, but a bunch of images of different shoes, and the user likes different attributes in different shoes, for e.g. laces in one shoe, heels in another shoe, etc. An interface can enable the user to select the shoe heel in one image, laces in another image, the toe in a third image, and so on. The system can then automatically identify the heel type, the lace type and the toe type from respective images, and search for them in the catalog. The search can be based on Computer Vision and Machine Learning methods that enable the system to find shoes with attributes that are visually similar to those selected by the user. Thus, the user has more fine-grained control over individual attributes and can personalize the search results to a much higher degree than what is possible using existing search tools. The initial set of images on which the user selects the attributes could either be uploaded by the user, or could be selected from within the images on a website (for instance, from within search and/or browse results).

The same concept can be applied to various other fashion items including shirts, pants, and accessories such as watches and belts. Going beyond fashion, these principles can be applied to enable intuitive searching for items such as furniture, homes, cars, bicycles, etc. where the visual aesthetic of an item is highly dependent on a user's personal taste.

For the purposes herein, an item can refer to a digital item such as a media item (e.g., a song, movie, television show, podcast, etc.), a web site, a videogame, an application, etc. An item can be a physical item such as a fashion item (e.g., clothing, shoes, accessories, etc.), furniture, a vehicle, etc. An item can be available for purchase, rent, lease, download, or otherwise obtain on a marketplace. The marketplace can be a digital marketplace accessible via a web browser. Items on the marketplace can be sold/provided by the marketplace directly and/or can be sold/provided by third parties.

It should be understood that an item can be a shirt, blouse, dress, coat, skirt, pants, shawl, jacket, necktie, vest, or any other article of clothing with identifiable features such as material, texture, color, shine, heft, inseam, fit, targeted body type, etc. The item can also include items that are not clothing related such as bicycles, toys, electronics, phones, books, décor, furniture, etc.

A search criterion can be used to search a database for items. A search criterion can be text, an image, a portion of an image, features of an item, etc. For example, a search criterion can be a string such as "red shoes," an image of a shoe, and/or a region of an image of a shoe highlighting a certain feature. A search criterion can be a swatch, such as an image that presents the color, texture, or other physical properties of a material. A search criterion can be used to build a mix and match search query of multiple search criteria.

An item can have various features. Item features can be identified from supplied specifications such as a brand of the item or a size of the item. Item features can include various characteristics such as: sizes (e.g., a shoe size, heel height, pant length, etc.), colors, luster, materials (e.g., plastic, leather, etc.), textures, style (e.g., "punk," "hipster," "80's", "Victorian," "casual," "fitness," etc.), logo (e.g., a brand, team, country, or other logo), text (e.g., a graphic tee), parts of the item (e.g., straps, buckles, rivets, heels, threads, laces, etc.), shapes found in the item (e.g., squares, circles, or a collection of curves and/or angles), shapes defining the overall form of the item (e.g., footprint), etc. An item feature can describe where on the item the feature is located, a relative size of the feature, and a relative orientation of the feature. An item feature can be described using more than one of the aforementioned characteristics. For example, a t-shirt can have a logo located in the front-middle of the shirt and the logo can be a plastic red circle. Each one of these characteristics can be considered a feature while the collection of characteristics can also be considered a feature, depending on the desired use.

Item features can be identified using machine learning techniques. A search criterion can include one or more item features described using respective characteristic(s). In some embodiments, a user can manually indicate which characteristics of a feature are important. In some embodiments, a system can automatically determine which characteristics of an item feature are likely of interest to the user. A combination can also be employed whereby a system automatically determines likely characteristics of interest and the user can indicate which of those likely characteristics should be included.

Example features include a pattern, a design, a curve (e.g., a printed curve and/or an exterior curve, a buckle style, a logo, a pocket design, a neckline, a shoulder style, a fit, a type of fabric, a rivet design a length, a width, a waist size, color, texture, etc.

Multiple search criteria can be combined to form a search query. A search query can include search logic with various search criteria. For example, a search query can indicate that results should include items that match some criteria of the search query while excluding items that match other criteria of the query. When building a search query, a user can indicate that the user likes a first feature of a first item and a second feature of a second item; the user can then generate search criteria from those features which can form a search query to find other items that match the first and second features.

A match can exist when two features are substantially similar to each other. Matching does not require that the two features are identical. For example, if a person submits a search query with a search criterion including a plaid pattern, the pattern might match a shirt with plaid design, even if the search criterion has different colors than the search. Matching can be determined based on a similarity score. For example, if an automated system determines that the similarity between two features is larger than a specific number (e.g., 90%), then the two features can be considered a match. The requisite similarity score to constitute a match can be different based on the type of feature. For example, a color match might have a high required similarity score whereas a curve match might have a lower required similarity score.

In some embodiments, feature fingerprints can help with the feature searching and matching process. A feature fingerprint can include a vector representing values describing the feature. For example, the fingerprint can be generated by inputting the feature into a convolutional neural network and capturing the output vector. Other systems are contemplated that can generate a feature fingerprint. The fingerprint can comprise a vector of characteristics of the feature (that may or may not be human intelligible) that differentiate the feature from other features. Features that are substantially similar with have feature fingerprints that are within a certain distance. This distance can be calculated as a Euclidian distance. For higher dimensions (e.g., greater than 9) other distance metrics can be used.

A fingerprint database can associate fingerprints with items. For example, if an item has three prominent features, a system can identify the three features, determine fingerprints for those features, and store those features with the item in the fingerprint database. A system can then search the fingerprint database using one or more fingerprints.

Figure 2A:
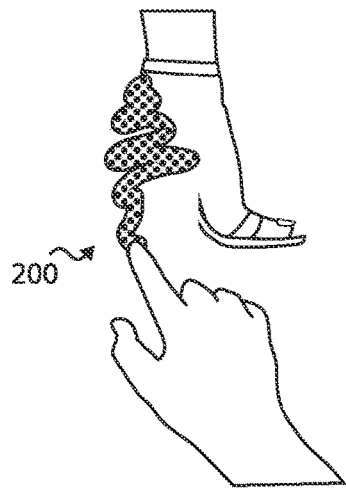
FIGS. 2A-2G depict various ways in which a user can build a search query according to various embodiments.

FIGS. 2A-2G depict various ways in which a user can build a search query according to various embodiments. Many of these figures depict a finger touching an image of an item. Other inputs means are contemplated including a stylus, a pen, a mouse, a trackpad, a joystick, a gesture, voice, etc. As shown in FIG. 2A, a user can "paint" onto a device by moving their finger or other input means across a screen of the device. The device can then detect the painted region 200 and determine what region of the item is being referenced. Various smoothing techniques can be used to turn the painted region into a smooth area while minimizing noise. For example, the painted region can be expanded until it can be defined by a polygon of no more than a predetermined number of vertices. The painted region can be converted into a spline or other curve defined by a number of anchor points. The system can simplify the spline or curve by decreasing the number of anchor points used to define the painted region. The system can remove internal "holes" and force the surface defined by the painted region to have a mathematical "genus" of zero. In some embodiments, the painted region can have portions that are more emphasized and other portions that are less emphasized. For example, a user may go over a portion multiple times. Thus, the resulting painted region can have a strength characteristic indicating portions of greater emphasis. The system can represent this emphasis by displaying the painted region as a heat map where more emphasized portions can be indicated with one color whereas less emphasized portions can be indicated with a second color.

In some embodiments, the system can compare the painted region with painted regions submitted by other users. The system can then modify the painted region to better conform to applicable related painted regions. For example, if the user attempted to highlight the heel and ankle portion as depicted in FIG. 2A, but also had a stray mark going towards the tip of the toe region, the system can attempt to identify the stray mark as an outlier. When comparing the painted region (and the stray mark) with previously submitted painted regions, the system can determine that the stray mark is an outlier and varies significantly from prior painted regions focusing on the heel and ankle portion. In other words, the system can use prior-submitted painted regions to adjust the current painted region.

Once the painted region is determined, the system can attempt to determine which feature(s) are included in the painted region. For example, in FIG. 2A, the heel and the ankle are included in the painted region. In some embodiments, the painted region can act as a filter to select points of interest of the item. The system can process the image of the item and detect feature points (e.g., pixel locations) that describe various features of the item. When the system then receives the painted region, it can determine which feature points are covered by the painted region. When a predetermined threshold number of feature points are covered by the painted region, then the corresponding feature can be selected by the painted region.

In some embodiments, the painted region serves as a pixel mask of the image of the item, causing pixels outside of the painted region to be blocked out or removed. In some embodiments, the painted region can be converted to a simple geometric shape such as a rectangle and the geometric shape can be used as an image mask.

Figure 2B:
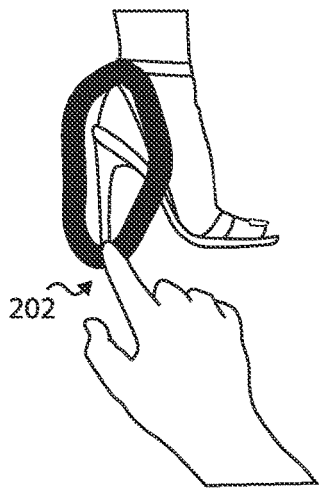

FIG. 2B represents a technique for selecting features by "lassoing" the features. For example, a user can indicate a bounding region that circumscribes the feature(s) that the user wishes to select. The system can then determine which feature points are circumscribed by the bounding region and select the associated feature(s). In some embodiments, the system can adapt the bounding region to better fit the image; for example, portions of the bounding region that cross through regions of low-contrast, then those portions can be brought closer to the centroid of the bounding region until they hit a region of greater contrast. In some embodiments, feature points (e.g., pixels or portions of a feature that define a part of the feature) can act as "magnets" that attract the bounding region while the user creates the bounding region.

Figure 2C:
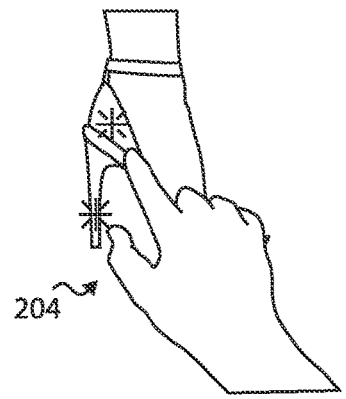

FIG. 2C represents a technique for selecting features by selecting them directly. A system can automatically detect potential features using various image processing techniques. Once multiple potential features are detected, the system can select a subset of potential features for presentation on the interface. The subset of features can be selected based on a confidence score. One technique for accomplishing this is to begin by selecting the potential feature with the highest confidence score and eliminate all potential features within a certain radius of the selected feature. This process can be repeated until all of the resultant potential features are relatively isolated. In some embodiments, the system can eliminate potential features with a confidence score below a threshold.

The confidence score can be determined based on the system's confidence that the potential feature is actual a feature and not noise. The confidence score can be determined based on the system's confidence that the potential feature might be selected by the user. For example, if the user has previously expressed preferences with regards to a feature and the potential feature matches the previously relevant feature, then the confidence score can be higher. In other words, perhaps the user has selected the heels of shoes in the past, the system can calculate that the user might be interested in the heel of the present shoe.

When potential features are identified, they can be presented for selection by the user. In some embodiments, indicia can be presented along with the feature to indicate that the features are selectable. For example, the feature can be outlined, the feature can be shown with a graphic (such as the stars in FIG. 2C), the feature can change color when the user "hovers" over the feature, etc.

Figure 2D:
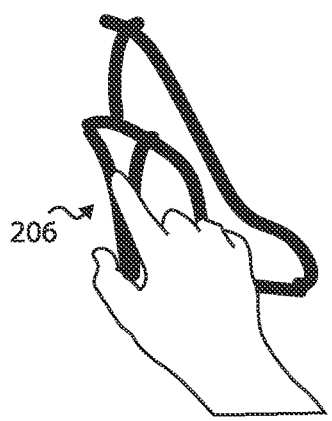

FIG. 2D represents a technique for selecting features by drawing 206 those features. While FIG. 2D represents a drawing of an entire item (shoe), drawing an incomplete item is contemplated. For example, if the item is a shoe, the user can draw just the outline of the heel of the shoe. In some embodiments, the user can draw on a "blank" page as depicted in FIG. 2D. Alternatively or additionally, the user can draw on top of an image of an item. For example, the user can draw how the user would like a feature to be. The system can then adapt an image of the item to fit the drawing. For example, if the item is a show and the user draws the heel of the shoe to be thinner, the system can modify the heel portion of the image to be thinner. This can be useful for other items as well. If a user wishes to search for a t-shirt having a different neckline, the user can draw the new neckline onto the t-shirt and the image of the t-shirt can be adapted to fit the new neckline. This can enable the user to visualize what they are looking for.

In some embodiments, the system can find feature(s) of item(s) that match the drawn feature(s) and can present a collage of features as a visualization of an item. This visualization can help the user refine their search. The system can then find items that match the features in the visualization.

Figure 2E:
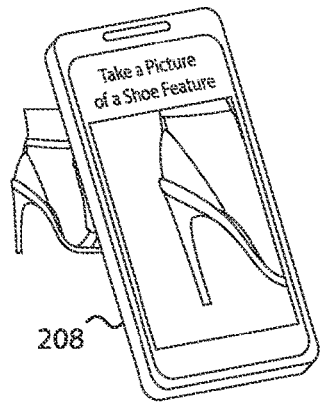

FIG. 2E represents a technique for selecting a feature by taking a picture of an item feature using a portable electronic device 208. When people shop for new fashion items, they typically try to ensure that what they buy fits with other items in their wardrobe. For example, a user might have a pair of shoes and is looking for a dress to match the color of the shoes. The user can then take a picture of the shoes and identify the shoe's color and/or texture and find a dress that has that same color. Another example is if the user has found that shoes with a certain contour have the best support for the user's feet. The user can then take a picture of the sole of a shoe and the system can identify a length and multiple widths of the sole to describe the contour of the sole and find similar shoes.

In some embodiments, the portable electronic device can do preprocessing to identify the feature and send information of the feature to a remote server. Alternatively or additionally, the portable electronic device can send the complete image to the remote server.

Figure 2F:

FIG. 2F represents a technique for selecting a feature from a list of features 210. A system can determine a list of features that a user might be interested in and the user can then select one or more of those features for inclusion in a search. In some embodiments, the system can highlight the selected feature in the image of the item as shown in FIG. 2F. For example, if the user selects the checkbox labelled "heel," then the system can highlight the heel area in the shoe picture.

Figure 2G:
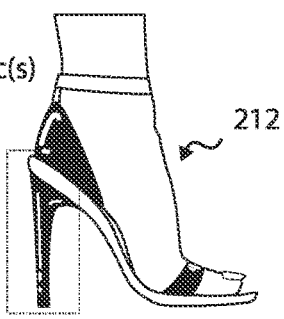

FIG. 2G represents a technique for selecting a feature characteristic of an item 212. Certain features may have one or more characteristics (which also can be termed sub-features or "features"). The system can determine that a selected feature has multiple possible characteristics and can present the user with an opportunity to select one or more of the characteristics. These characteristics can be different for different features. For example, a heel can have a "height" characteristic, a "shape" characteristic, and a "color" characteristic while a strap can have a "thickness" characteristic, a "color" characteristic, a buckle characteristic, etc. In FIG. 2G, after selecting the heel feature of the shoe, the system has determined that the height, color, texture, and shape of the heel may be of interest to the user. In the example of FIG. 2G, the user may only be interested in the color and general shape of the heel, but might be indifferent to the texture and height of the selected heel feature.

Figure 3:
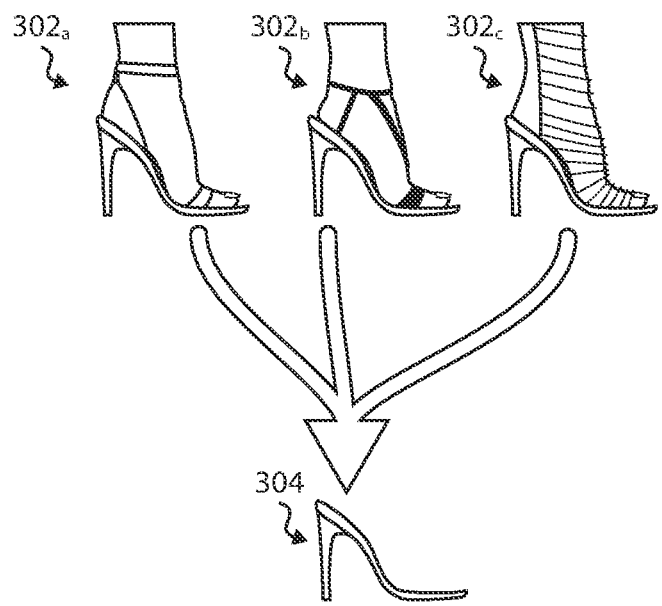
FIG. 3 represents a technique for combining multiple example items to extract features of interest.

FIG. 3 represents a technique for combining multiple example items to extract features of interest. In some embodiments, a user can select multiple items (e.g. items $302_a$, $302_b$, $302_c$) and the system can identify features common to each of those items. For example, the system can generate a composite feature 304 from selected items. This can be done by identifying each feature of each selected item and finding the features that are common (e.g., substantially matching) between each of the selected items. This can be done using computer vision techniques. The generated composite feature 304 can include one or more features. In some embodiments, the composite feature is an image as shown in FIG. 3. Additionally or alternatively, the composite feature 304 can be a vector of values that might not be easily visually perceived.

Figure 4:
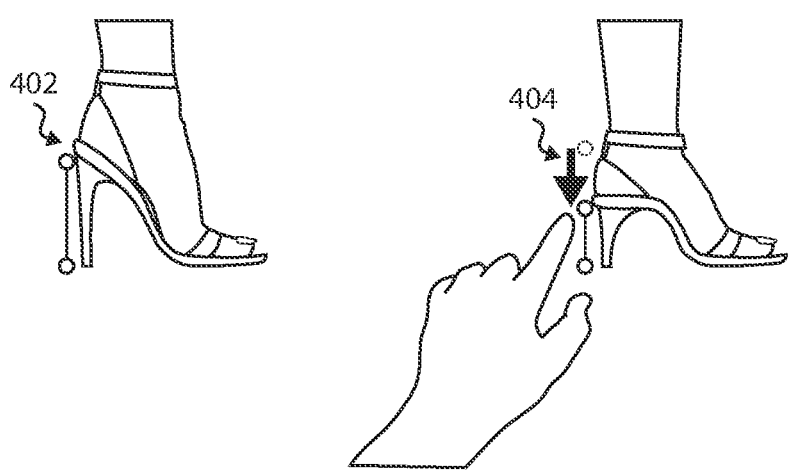
FIG. 4 represents a technique for modifying a feature according to some embodiments.

FIG. 4 represents a technique for modifying a feature according to some embodiments. For example, the user may generally like a heel 402 of one shoe but would like to adjust a characteristic of that heel (e.g., the height). The system can provide adjustment points for the feature whereby a user can move 404 an adjustment point to change that feature. In some embodiments, the system can provide multiple adjustment points that can describe a line, spline, or other curve and the user can move the adjustment point to adjust the feature. The system can adapt the image of the feature to correspond to the adjusted points. Other active adjustments are contemplated such as enabling a user to draw a texture, apply a color, or remove features (e.g., a line), etc.

Figure 5:
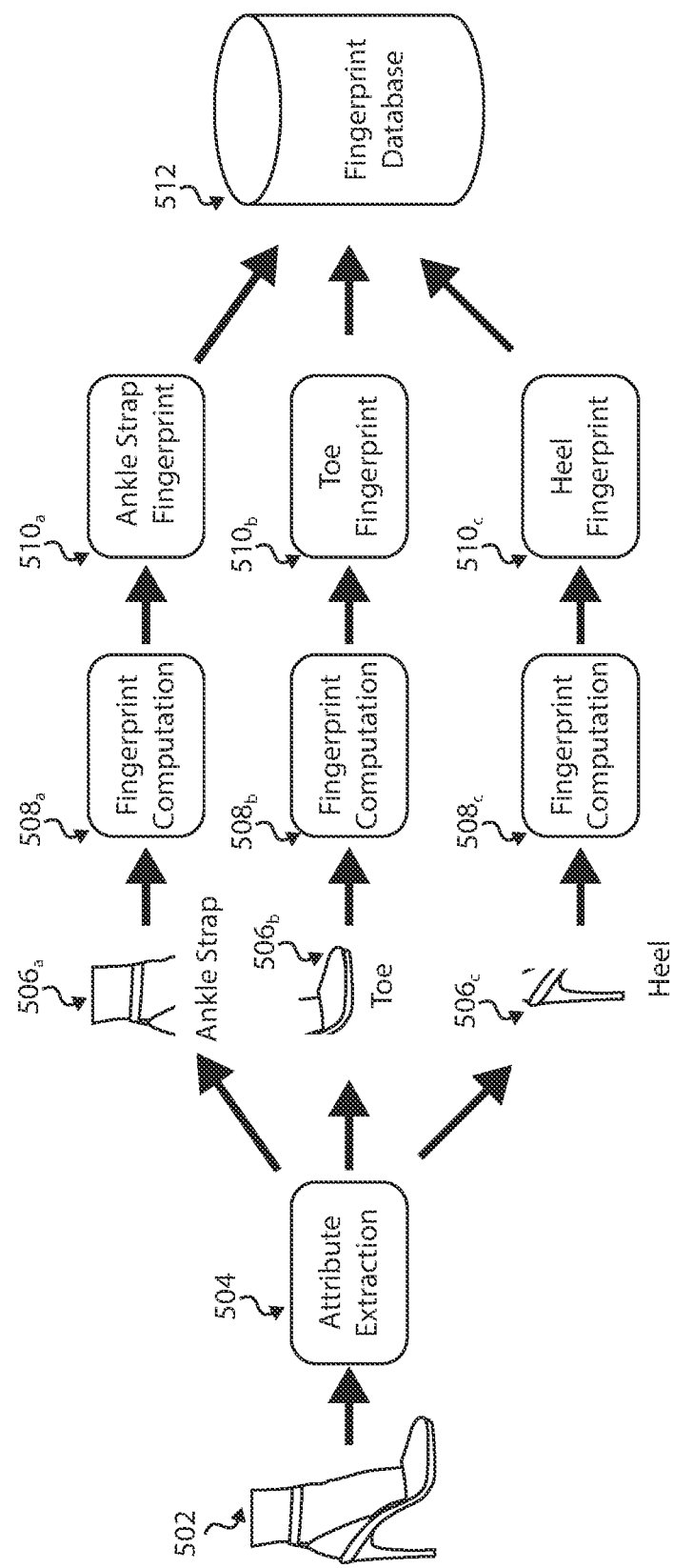
FIG. 5 represents a technique for generate fingerprints and saving them in a database according to various embodiments.

FIG. 5 represents a technique for generating fingerprints and saving them in a database according to various embodiments. A system can obtain an image of an item 502 and run the image through an attribute extraction process 504. The attribute extraction process 504 can automatically identify attributes (e.g., features, sub-features, characteristics) using the image of the item. In some embodiments, the attribute extraction process 504 can utilize multiple images of the item to identify features of the item (e.g., a front view and a back view). Identifying features can include using a convolutional neural network and/or other machine learning, computer vision, and artificial intelligence techniques to identify features of an image.

In some embodiments, a feature can be selected to indicate that the user wants items that do not have that feature. For example, if the user does not like the style of heel on a shoe, the user can select the heel and indicate that the user does not like that heel style. The system can then use the principles herein disclosed to omit results that include that rejected style of heel. In some embodiments, a user can include one feature of an item and exclude another feature. Thus, the search query can include positive criteria (e.g., features that the user likes) and negative criteria (e.g., features that the user dislikes). The user can indicate by a thumbs-up or thumbs-down indicator.

In FIG. 5, the system detects features including an ankle strap $506_a$, a toe feature $506_b$, and a heel feature $506_c$. The system can also identify sub-features (e.g., characteristics) such as a heel length, colors, etc. The system can then send the identified features through a fingerprint computation process (e.g., steps $508_a$, $508_b$, and $508_c$) to calculate fingerprints for the features. A fingerprint can be a standardized data format that represents the attributes of a feature. The fingerprint can be a fixed data size and/or vector size. The fingerprint can be an output of a neural network (e.g., a vector comprising values of output nodes).

In some embodiments, a variety of types of fingerprints can be determined. For example, a heel feature can be associated with a heel fingerprint type while a toe feature can be associated with a toe fingerprint type. A preliminary analysis can determine which types of features are present and then calculate the fingerprints for those features. This can result in each fingerprint type having a different size. This can be beneficial as certain features may require larger fingerprints to adequately describe the features. For example, a shoe shape might require more data to describe than a heel height. In some embodiments, a system can review the typical diversity on a certain feature and automatically determine an appropriate fingerprint size required to sufficiently and distinctly capture that diversity. A system that can be used to achieve this can be an autoencoder neural network or similar. The central layer of nodes of the autoencoder can describe the fingerprint of the feature. The number of nodes and the specificity (e.g., the number of decimal places) of each node can be adjusted until a minimum amount of data can sufficiently describe distinct features of the feature type.

The fingerprint computations can then result in respective fingerprints. For example, ankle strap $506_a$ can result in ankle strap fingerprint $510_a$, toe feature $506_b$ can result in toe fingerprint $510_b$, and heel feature $506_c$ can result in heel fingerprint $510_c$. These fingerprints can then be stored in the fingerprint database 512. The fingerprint database can be stored on a network server. The fingerprint database can be organized such that fingerprints are easily searched for. For example, a hash map can have the fingerprints as keys and the items as values. Searching the hash map can include locality sensitive hashing. The system can do a first search using a first fingerprint to determine a subset of the database items. This subset can then be searched using a second fingerprint and subsequent fingerprints until a resultant subset of items is determined. In some embodiments, the database can be searched based on exact matches; that is, that a fingerprint that is being used for a search is an exact match of a fingerprint within the fingerprint database 512. In some embodiments, a partial or close match can be sufficient to identify related items. For example, two fingerprints can match if they have a Euclidean distance below a predetermined number. Two fingerprints can be determined to be matching based on other closeness metrics.

Figure 6:
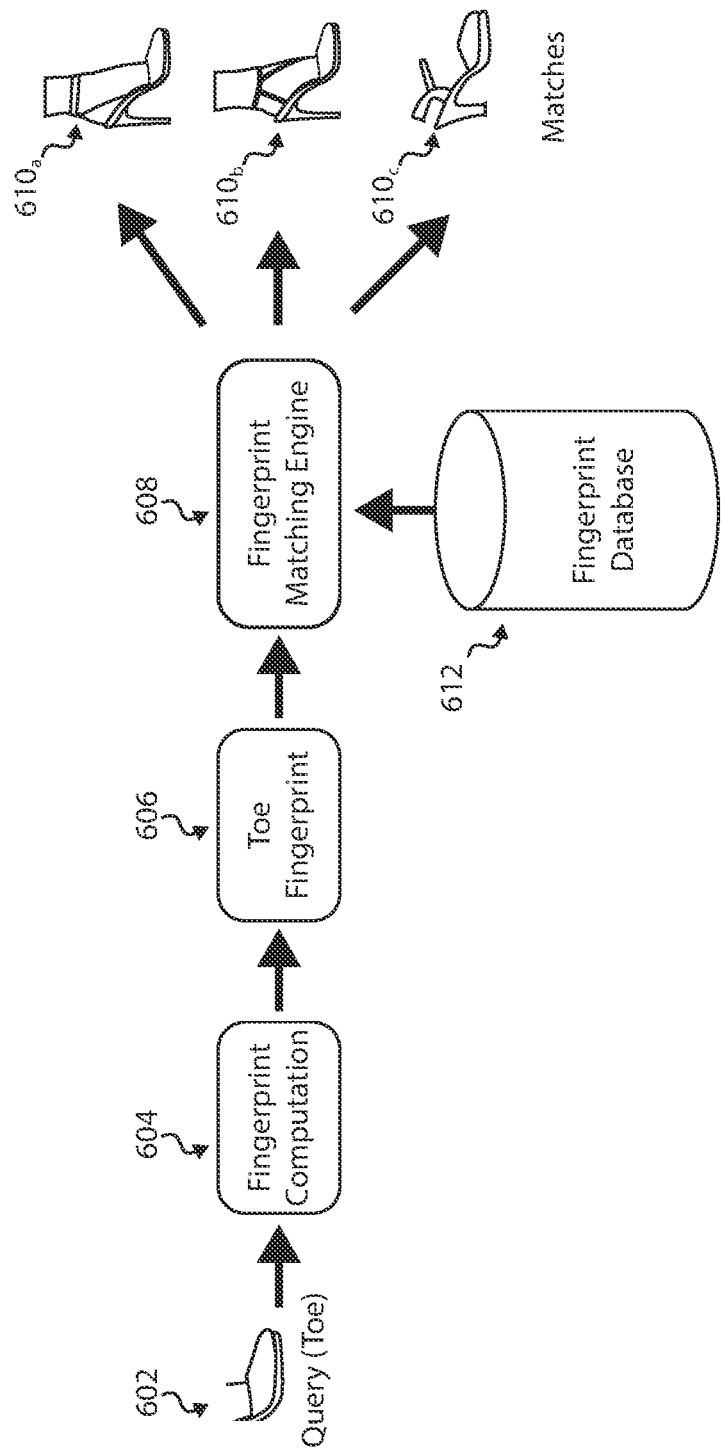
FIG. 6 presents an example technique for searching a fingerprint database using a feature.

FIG. 6 presents an example technique for searching a fingerprint database using a feature. A system can obtain a feature. The feature can be provided as a query criterion such as image of the toe feature 602. The feature can be obtained from a region of an image of an item database. The feature can be obtained from an image from a portable electronic device. The system can calculate 604 from the feature. The fingerprint can be calculated using techniques herein described. In some embodiments, a convolutional neural network can be utilized to assist in creating the feature fingerprint. The resultant toe feature fingerprint 606 can then be passed to a fingerprint matching engine 608. The fingerprint matching engine 608 can compare the feature fingerprint 606 with fingerprints within a fingerprint database 612 to determine a match. The match can be determined when two fingerprints are identical. The match can be determined when the two fingerprints have at least a predetermined amount of similarity.

The system can identify matches $610_{a-c}$ based on the fingerprint and the fingerprint database. These matches can be items that are within an item repository. In FIG. 6, each match contains the queried feature. The matched items (or associated identifiers) can be sent to a portable electronic device which can permit a user to browse items that have the queried feature.

Figure 7:
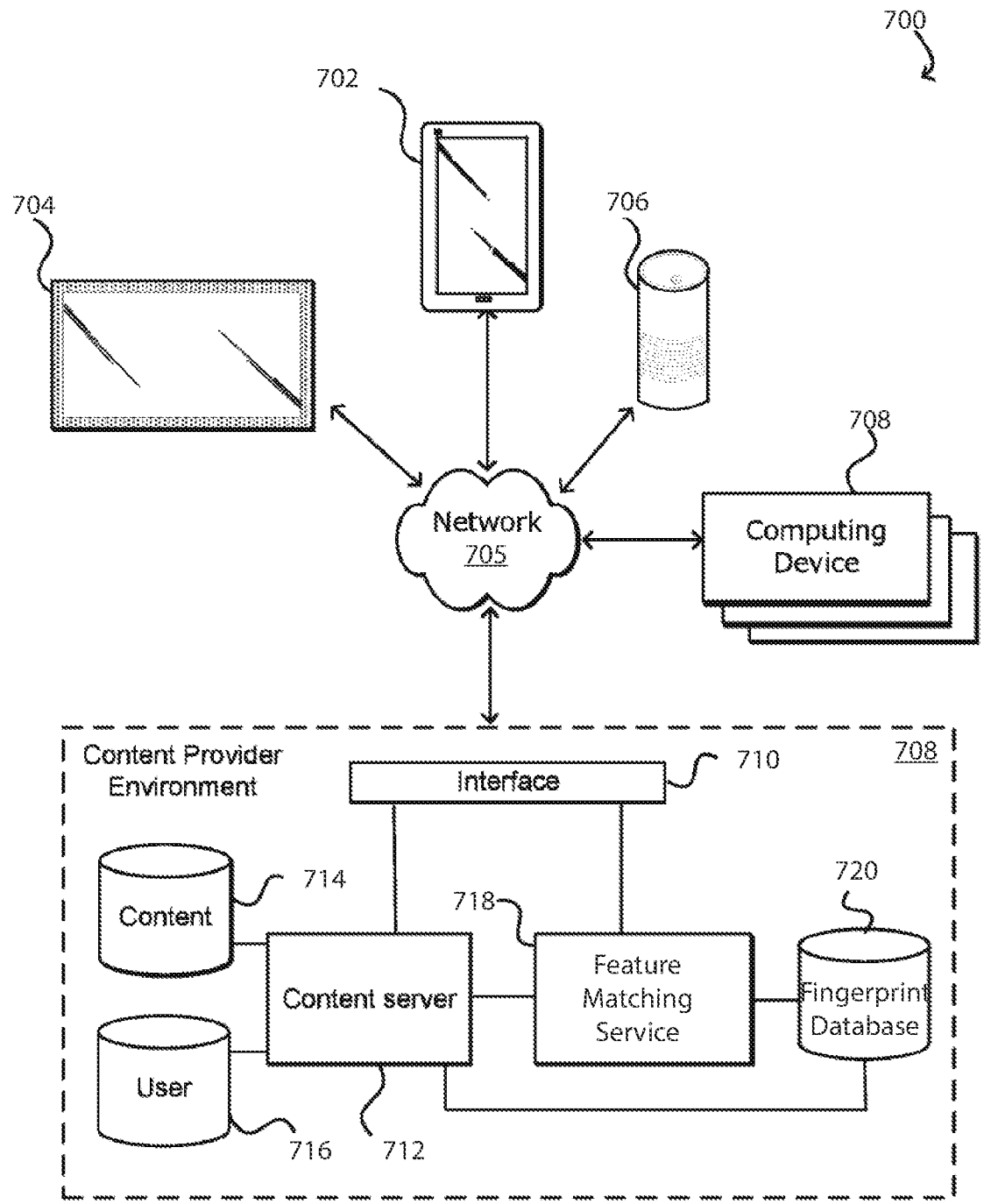
FIG. 7 illustrates an example of an environment that can be used to implement aspects in accordance with various embodiments.

FIG. 7 illustrates an example of an environment 700 that can be used to implement aspects in accordance with various embodiments. As described, various embodiments enable content to be presented on secondary computing devices remote a primary computing device. The secondary computing devices may be remote from and not tangibly connected with the primary computing device. In some embodiments, the primary and secondary computing devices may be tangible connected. In FIG. 7, client computing device 702 can represent the primary computing device and the secondary computing devices can include display device 704, active listening device 706 (e.g., a smart speaker or digital assistant), and computing devices 708 that can represent anyone of a number of devices. The primary computing device can communicate directly with one or more of the secondary computing devices. For example, devices can communicate one another using any communication protocol known in the art such as, but not limited to, BLUETOOTH®, Wi-Fi and radio frequency. Additional or alternatively, the devices can communicate through a resource provider environment 708 across at least one network 705. The devices can also communicate with the resource provider environment for various other purposes as described herein.

In this example, a call received to the resource provider environment 708 for additional or supplemental content can be received by an interface layer 710 of the environment. As known for network environments, the interface layer can include components such as interfaces (e.g., APIs), load balancers, request and/or data routers, and the like. In this example a request can include a request for an item identifier or a request to respond to a command/query. The request can be directed to one or more content servers 712, which can obtain the content (e.g., primary content and/or secondary content) from a content data store 714 or other such repository to be sent back across the network(s) to an appropriate one of the devices (702, 704, 706, 708). In some embodiments, information for the request might also be compared against user data in a user data store 716 or other such location do determine, for example, whether the user has access rights to that content.

In some cases, a request received to the content provider environment 708 might be from another entity, such as one of the secondary computing devices As discussed elsewhere herein, additional or secondary computing devices can present secondary content to users as part of, or along with, the primary content. The interface layer can determine the type of request and cause information to be forwarded to content server 712 or fingerprint matching service 718 to perform digital assistant tasks or other such system or service. In various embodiments, the fingerprint matching service 718 can interpret speech, decode product identifiers, and generate responses. Fingerprints and information identifying associated items can be stored in fingerprint database 720. Information for such purposes may be included in the request and/or obtained from user data store 716. In various embodiments, the devices can receive input to control the presentation of content. The input can be a touch-based input, a gesture-based input (e.g., waving at the primary computing device), an audio-based input (e.g., utterance received by the primary computing device), a motion-based input (e.g., movement of the primary computing device), an image-based input, among other such inputs. The input can trigger a request for content, and the content server and/or the image analysis service can determine the appropriate content to be provided. Accordingly, a user can view and interact with presented content, and can maneuver through various content items using various approaches discussed and suggested herein.

Figure 8:
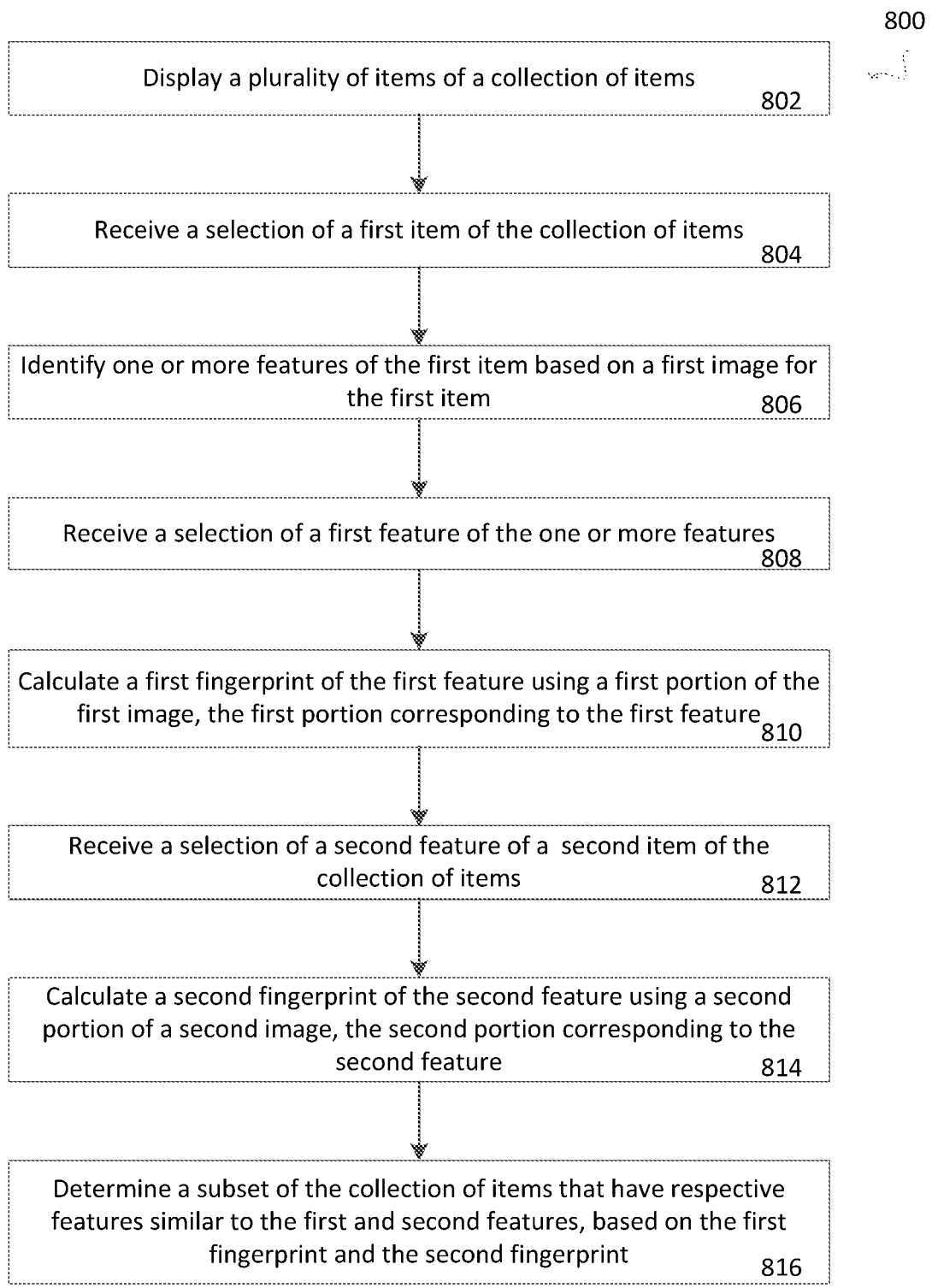
FIG. 8 illustrates an example process according to various embodiments.

FIG. 8 illustrates an example process 800 according to various embodiments. A system can begin and display a plurality of items of a collection of items 802. For example, the system can present on an interface for a client device, a list of items available for purchase on a digital marketplace. In some embodiments, only a few items of an entire collections are presented at a time in the interface. The interface can display images associated with the items, such as thumbnail images.

The system can then receive a selection of a first item of the collection of items 804. For example, a user can select (e.g., touch, click, hover, etc.) an item. The user might be interested in the item or a feature of the item and wishes to refine the interface to show items that are related to the selected item. The system can then identify one or more features of the first item based on a first image for the first item 806. For example, the system can use a convolutional neural network on an image related to the item to identify features of the item. Other machine learning and image processing techniques can be utilized such as image segmentation.

The system can then receive a selection of a first feature of the one or more features 808. The user can select a feature by painting on the image as described herein, "lassoing" the feature, selection the feature, etc. The system can then calculate a first fingerprint of the first feature using a first portion of the first image, the first portion corresponding to the first feature 810. In some embodiments, the calculation is performed when the item is ingested into an item database. In some embodiments, the fingerprint calculation is performed after a feature is selected.

The system can receive a selection of a second feature of a second item of the collection of items 812. The system can then calculate a second fingerprint of the second feature using a second portion of a second image, the second portion corresponding to the second feature 814. This allows a user to select multiple features that may or may not reside on the first selected item. In some embodiments, a feature can be selected as a negative example, that is, that the resulting search should exclude items with that feature.

The system can then determine a subset of the collection of items that have respective features similar to the first and second features, based on the first fingerprint and the second fingerprint.

Figure 9:
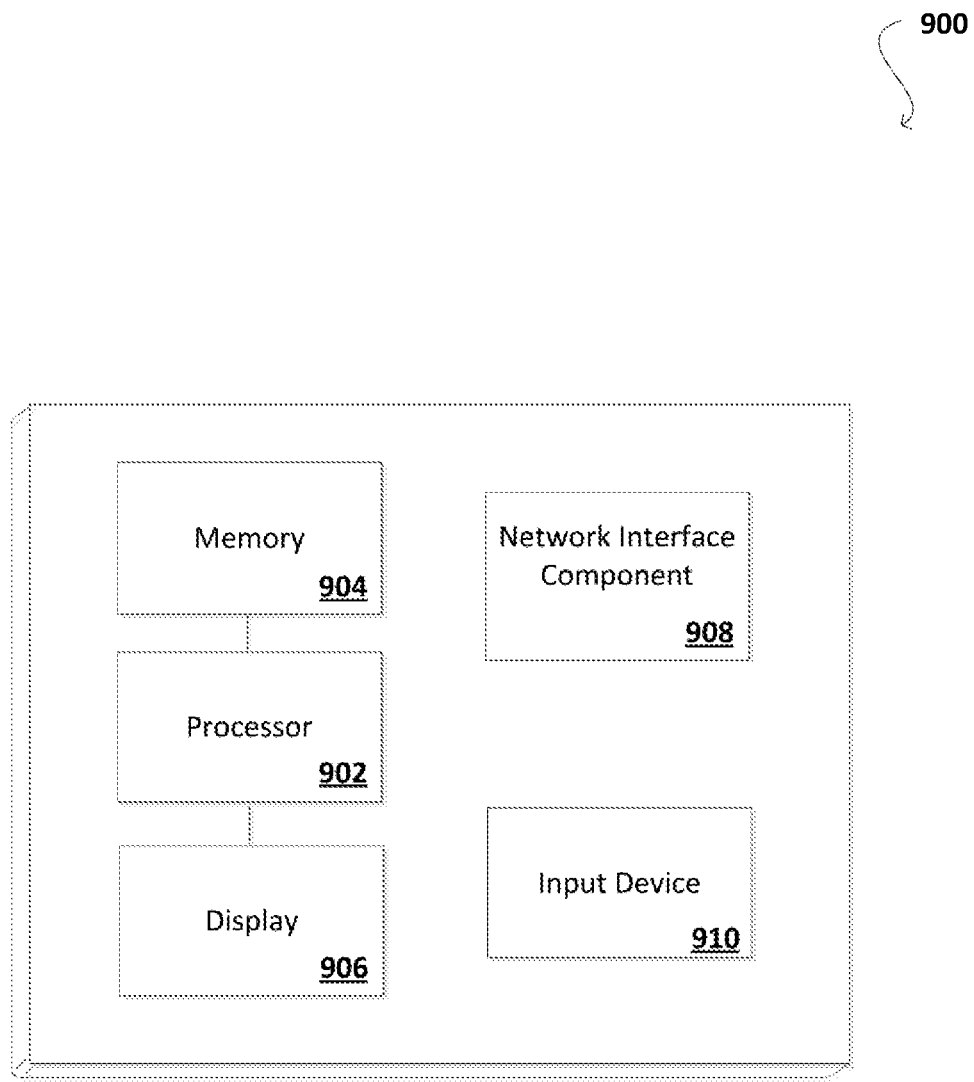
FIG. 9 illustrates example components of a computing device that can be utilized in accordance with various embodiments.

FIG. 9 illustrates a logical arrangement of a set of general components of an example computing device 900 that can be used to implement aspects of the various embodiments. In this example, the device includes a processor 702 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one input element 910 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 900 of FIG. 9 can include one or more network interface components 908 for communicating over various networks, such as a Wi-Fi, Bluetooth, RF, wired, or wireless communication systems. The device in many embodiments can communicate with a network, such as the Internet, and may be able to communicate with other such devices.

Figure 10:
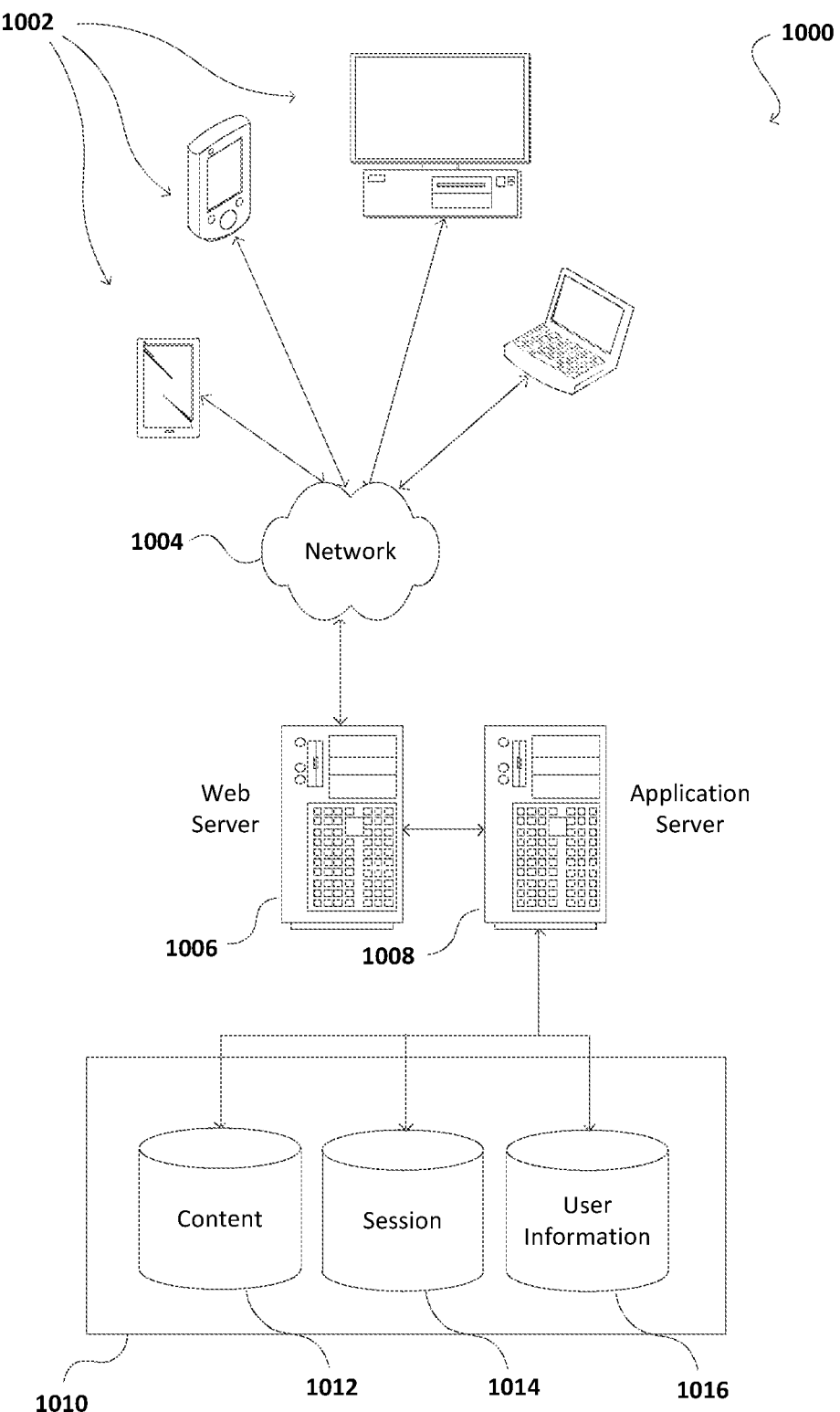
FIG. 10 illustrates an example environment in which aspects of the various embodiments can be implemented.

As discussed, different approaches can be implemented in various environments in accordance with the described embodiments. For example, FIG. 10 illustrates an example of an environment 1000 for implementing aspects in accordance with various embodiments, such as to obtain content to be rendered by a 3D or VR headset, or other such device or display. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. This can include, for example, image information captured for the face of a user or a request for virtual reality content to be rendered on a virtual reality headset or other such device. Examples of client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for searching a collection of items, comprising:
    receiving a selection of a first feature of a first item of the collection of items based on a first image for the first item;
    calculating a first fingerprint of the first feature using a first portion of the first image, the first portion corresponding to the first feature;
    receiving a selection of a second feature of a second item of the collection of items;
    calculating a second fingerprint of the second feature using a second portion of a second image, the second portion corresponding to the second feature; and
    determining a subset of the collection of items that have respective features similar to the first and second features, based on the first fingerprint and the second fingerprint.

2. The computer-implemented method of claim 1, further comprising:
    determining, using an autoencoder neural network, a fingerprint size of the first fingerprint and the second fingerprint based at least in part on a typical diversity of the first feature and the second feature, respectively.

3. The computer-implemented method of claim 1, further comprising:
    receiving a selection of a third feature; and
    calculating a third fingerprint of the third feature, determining that the subset of the collection of items do not have respective features similar to the third feature, based on the third fingerprint.

4. A computer-implemented method comprising:
    identifying one or more features of an item of a collection of items based on an image for the item;
    receiving a selection of at least one feature of the one or more features;
    calculating a fingerprint of the at least one feature; and
    determining a subset of the collection of items that have respective features similar to the at least one feature, based at least in part on the fingerprint.

5. The computer-implemented method of claim 4, further comprising:
    receiving a selection of a second feature of a second item of the collection of items;
    calculating a second fingerprint of the second feature; and
    determining a second subset of the subset of the collection of items that have respective features similar to the second feature, based on the second fingerprint.

6. The computer-implemented method of claim 5, further comprising:
    determining, using an autoencoder neural network, a fingerprint size of the fingerprint and the second fingerprint based at least in part on a typical diversity of the at least one feature and the second feature, respectively.

7. The computer-implemented method of claim 4, further comprising:
    presenting an indication on the image that the at least one feature is selectable.

8. The computer-implemented method of claim 4, wherein receiving a selection of the at least one feature further comprises:
    receiving an input to paint a region of the image; and
    determining that the region of the image pertains to the at least one feature.

9. The computer-implemented method of claim 4, further comprising:
    determining a type of the at least one feature; and
    generating the fingerprint using a process configured for the type of the at least one feature.

10. The computer-implemented method of claim 4, further comprising:
    receiving a selection of a second feature of the item, the selection of the second feature indicating that the subset of the collection of items should exclude items with the second feature; and
    determining the subset of the collection of items further based on a second fingerprint of the second feature.

11. The computer-implemented method of claim 4, further comprising:
    receiving, from a client device, a user image of a second feature; and
    determining the subset of the collection of items further based on a second fingerprint of the second feature.

12. The computer-implemented method of claim 4, further comprising:
    receiving an input to adjust the at least one feature resulting in an adjusted feature;
    calculating an adjusting fingerprint from the adjusted feature; and
    determining an adjusted subset of the collection of items based on the adjusted fingerprint.

13. A system, comprising:
    at least one processor; and
    memory including instructions that, when executed by the at least one processor, cause the system to:
        obtain a collection of items;
        identify one or more features of an item of a collection of items based on an image for the item;
        receive a selection of at least one feature of the one or more features;
        calculate a fingerprint of the at least one feature; and
        determine a subset of the collection of items that have respective features similar to the at least one feature, based on the fingerprint.

14. The system of claim 13, wherein the instructions when executed further cause the system to:
    receive a selection of a second feature of a second item of the collection of items;
    calculate a second fingerprint of the second feature; and
    determine a second subset of the subset of the collection of items that have respective features similar to the second feature, based on the second fingerprint.

15. The system of claim 14, wherein the instructions when executed further cause the system to:
    determine, using an autoencoder neural network, a fingerprint size of the fingerprint and the second fingerprint based at least in part on a typical diversity of the at least one feature and the second feature, respectively.

16. The system of claim 13, wherein the instructions when executed further cause the system to:
    present an indication on the image that the at least one feature is selectable.

17. The system of claim 13, wherein the instructions that cause the system to receive a selection of the at least one feature further cause the system to:
- receive an input to paint a region of the image; and
- determine that the region of the image pertains to the at least one feature.

18. The system of claim 13, wherein the instructions when executed further cause the system to:
- determine a type of the at least one feature; and
- generate the fingerprint using a process configured for the type of the at least one feature.

19. The system of claim 13, wherein the instructions when executed further cause the system to:
- receive a selection of a second feature of the item, the selection of the second feature indicating that the subset of the collection of items should exclude items with the second feature; and
- determine the subset of the collection of items further based on a second fingerprint of the second feature.

20. The system of claim 13, wherein the instructions when executed further cause the system to:
- receive, from a client device, a user image of a second feature; and
- determine the subset of the collection of items further based on a second fingerprint of the second feature.

\* \* \* \* \*